United States Patent [19]
Abramson et al.

[11] Patent Number: 5,857,117
[45] Date of Patent: Jan. 5, 1999

[54] APPARATUS AND METHOD FOR MULTIPLEXING INTEGRATED DEVICE ELECTRONICS CIRCUITRY WITH AN INDUSTRY STANDARD ARCHITECTURE BUS

[75] Inventors: Darren Abramson, Folsom; Joe A. Bennett, Rancho Cordova, both of Calif.

[73] Assignee: Intel Corporation, Santa Clara, Calif.

[21] Appl. No.: 577,866

[22] Filed: Dec. 22, 1995

[51] Int. Cl.$^6$ ................................................. G06F 13/00
[52] U.S. Cl. .......................... 395/885; 395/821; 395/841
[58] Field of Search ................................. 395/800, 821, 395/841, 885, 800.01

[56] References Cited

U.S. PATENT DOCUMENTS

| | | | |
|---|---|---|---|
| 5,295,247 | 3/1994 | Chang et al. ........................ | 395/309 |
| 5,590,375 | 12/1996 | Sangveraphunsiri et al. ......... | 395/841 |
| 5,603,050 | 2/1997 | Wolford et al. ..................... | 395/821 |
| 5,678,064 | 10/1997 | Kulik et al. ........................ | 395/848 |

*Primary Examiner*—Alyssa H. Bowler
*Assistant Examiner*—Walter D. Davis, Jr.
*Attorney, Agent, or Firm*—Blakely, Sokoloff, Taylor & Zafman LLP

[57] ABSTRACT

A transceiver as provided for effectively multiplexing IDE address and data lines with selected ISA address and data lines. Compatibility among the IDE data transfers and ISA functions are achieved by multiplexing the ISA lines that do not involve the ISA refresh of the ISA expanded memory. The transceiver includes an enable input that, when disabled, effectively isolates the IDE data lines from the ISA bus so that IDE data transfers can occur. When the enable input is active, the ISA lines not related to refresh are connected to the IDE data lines so that ISA operations can occur. Furthermore, a directional input is included in the transceiver for allowing a central processing unit to control the ISA when the directional input is active and for allowing a PCI/ISA bridge between the PCI bus and the ISA bus to control the ISA operations included the multiplexing. The result is a rearrangement of the IDE data lines with the ISA bus to eliminate a multitude of pins and connectors.

11 Claims, 3 Drawing Sheets

APPARATUS AND METHOD FOR MULTIPLEXING INTEGRATED DEVICE ELECTRONICS CIRCUITRY WITH AN INDUSTRY STANDARD ARCHITECTURE BUS

BACKGROUND OF THE INVENTION

1. Field of the Invention

The present invention relates to data processing systems and, more particularly, to devices used to interface internal components of a microprocessor-based system.

2. Description of Related Art

Conventional computer systems generally include one or more central processing units (CPU's) providing primary controls of the computer system. These CPUs are connected through a host bus to a Host/PCI bus bridge that interfaces among the CPU, the main memory and the peripheral components. The Host/PCI bridge is connected to a peripheral component interface (PCI) bus, which is connected to peripheral components such as local area networks, graphics cards and mass media devices.

Also included in conventional systems is a PCI/ISA bridge that interfaces the PCI bus with an industry standard architecture (ISA) bus. The ISA bus interfaces with peripheral devices such as hard drives, CD ROMs, keyboard input, mouse input, etc. Mass storage components are serviced by the ISA bus and are accessible by the CPU through the PCI/ISA bridge. These peripheral components are much slower than components connected to the PCI bus. Components on the PCI bus usually operate at an optimum 33 MHz, where components on the ISA bus typically run at 8 MHz. Therefore, the bridge acts as a PCI/ISA bridge so that the slower peripheral components serviced by the ISA bus are made compatible with the main system.

In a typical data transfer sequence from the mass storage devices, a CPU sends an Integrated Device Electronics (IDE) data transfer command through the host bus which in turn sends the command through the host/PCI bus bridge to the PCI bus. From there, the PCI bus sends a command through the PCI/ISA bridge. The PCI/ISA bridge then takes over the IDE data transfer operations. The command from the CPU programs the PCI/ISA bridge to carry out the IDE data transfer operation through predetermined procedures. The PCI/ISA bridge is connected to an IDE circuitry that interfaces the mass storage devices such as hard drives, CD ROMs, tape backups, etc. The IDE circuitry is connected to the traditional computer hard drive through a ribbon cable. In conventional systems, more than one set of IDE circuitry can exist so that the system has access to multiple mass storage devices. In an IDE data transfer cycle, the PCI/ISA bridge accesses the IDE circuitry through a series of data lines that access the mass storage devices through the IDE circuitry. Typically, separate pins of the PCI/ISA bridge are used to transfer this data.

Aside from access to peripheral devices, the ISA bus also includes an ISA expansion memory that requires refresh. During refresh, the entire ISA bus is taken out of operation so that the refresh cycles can commence. During these cycles, typically once every 15 $\mu$s, or $\frac{1}{15}$ of the total operating time, no functions can be executed on the ISA bus.

Optimization of a computer system as a whole requires that communication lines and connectors be kept to a minimum in order to maintain speed, efficiency, simplicity and manufacturability. One way of optimizing a computer system is to multiplex lines to share paths and connections. Both the IDE circuitry and the ISA bus require multitudes of paths and connections including data, address and control lines. A great deal of circuitry and space could be saved if nonconflicting portions of these two systems could be multiplexed. Unfortunately, conventional methods cannot accomplish this without stopping IDE data transfers during ISA refresh cycles.

Accordingly, it would be of great use to the computer industry to successfully multiplex portions of the IDE circuitry with nonconflicting portions of the ISA bus. As will be seen, the present invention accomplishes this in a simple and elegant manner.

SUMMARY OF THE INVENTION

The present invention provides for a device and method of multiplexing IDE circuitry with the ISA bus. In particular, the present invention provides for a transceiver that selectively isolates the IDE circuitry from the ISA bus so that the ISA bus can run refresh cycles to the ISA expansion memory while data transfers can occur through the IDE circuitry. This is accomplished by multiplexing the data lines and address lines of the IDE circuitry with the ISA address lines, the ISA chip selects, the ISA refresh control pin and the four ISA address lines, all of which are not related to ISA refresh cycles. In conventional computer systems, the benchmark software will be faster since ISA refresh is independent. This is possible since data transfers in response to the CPU do not conflict with nonrefresh ISA cycles. Accordingly, multiplexing the IDE data and address lines with ISA lines that are not related to refresh cycles are possible. The embodiment of the present invention also provides circuitry for allowing an external ISA bus master i.e. a CPU, as well as using the ISA/PCI bridge as an ISA master.

DETAILED DESCRIPTION OF THE PREFERRED EMBODIMENT

Figure 1:
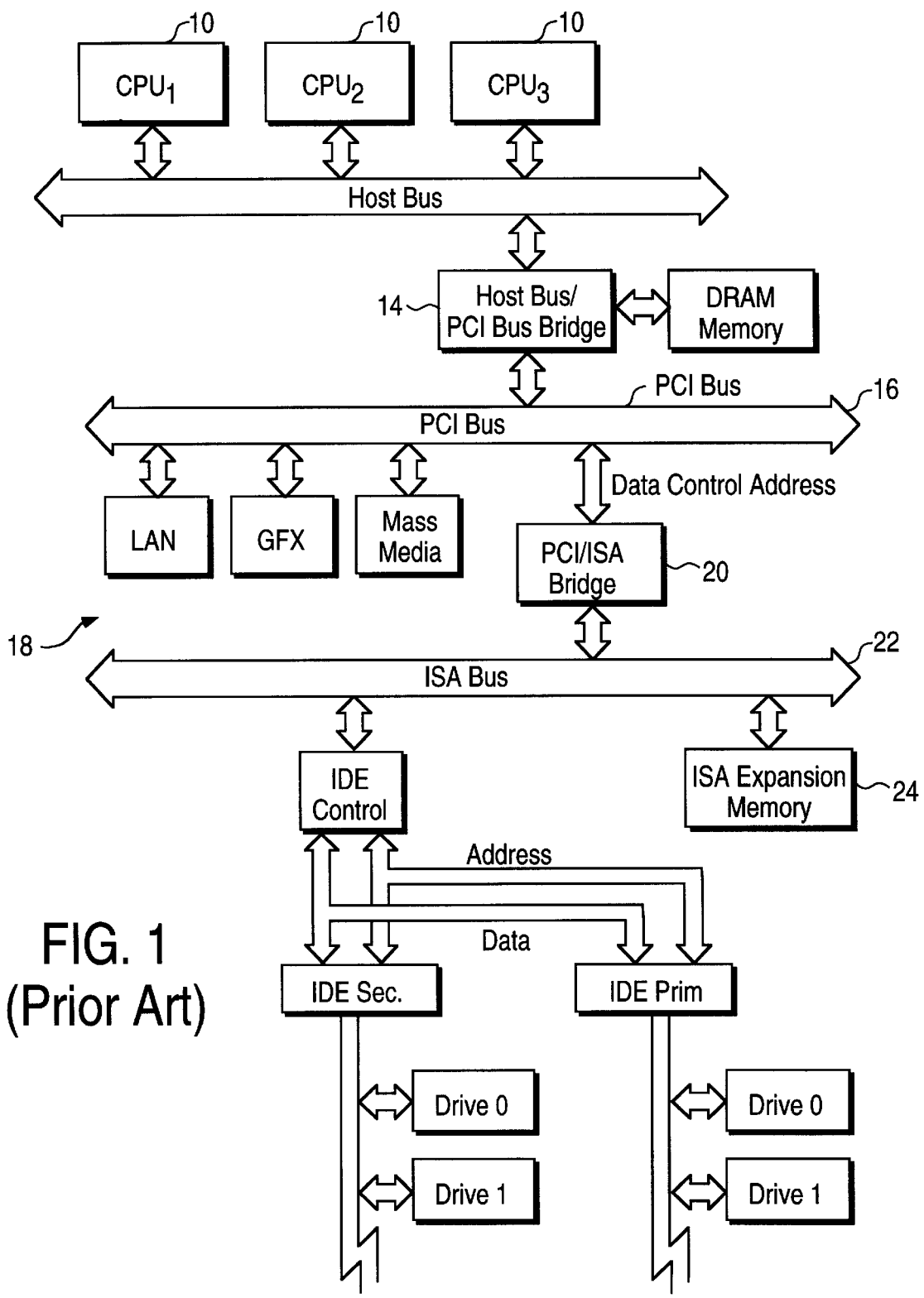
FIG. 1 is a general block diagram of a computer system utilizing an ISA bus and IDE circuitry in the prior art.
Figure 2:
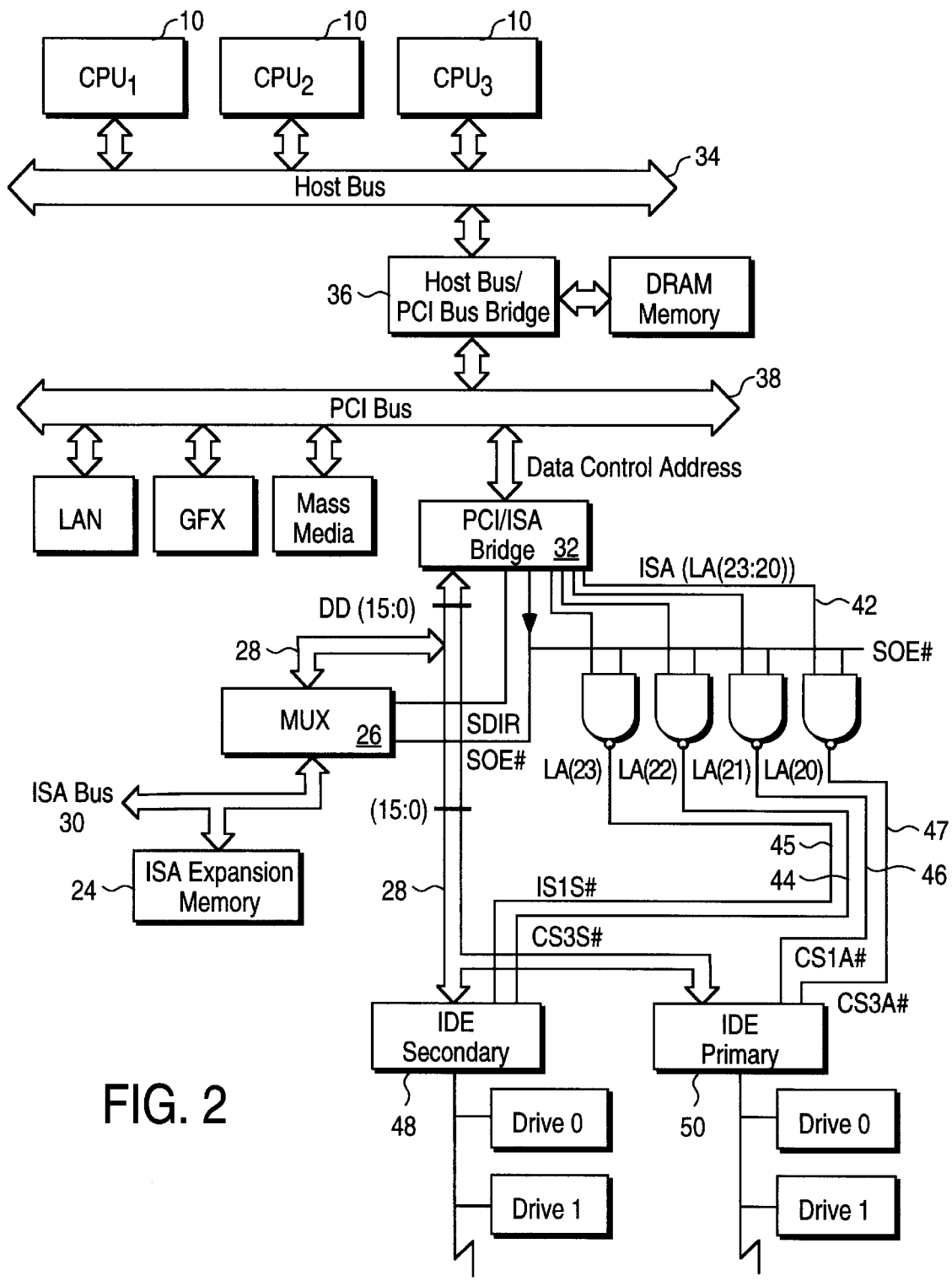
FIG. 2 is a general block diagram of a computer system utilizing an ISA bus and IDE circuitry and a transceiver in accordance with one embodiment of the present invention.
Figure 3:
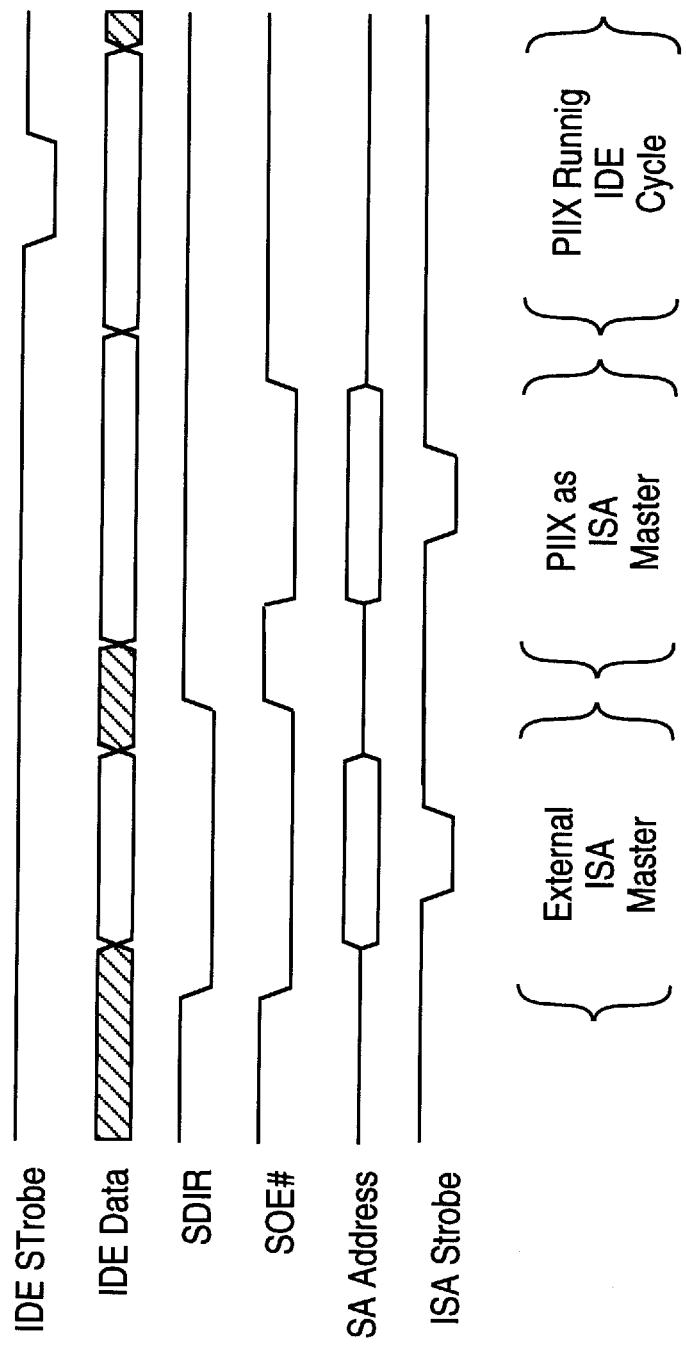
FIG. 3 is a timing diagram illustrating ISA bus and IDE circuitry functions in accordance with one embodiment of the present invention.

FIGS. 1 through 3 of the drawings disclose various embodiments of the present invention for purposes of illustration. One skilled in the art will recognize alternative embodiments that may be employed without departing from the principles of the invention that are illustrated by the structures and methods described herein.

To understand the essence of the present invention, an understanding of a system of the prior art is required. As shown in FIG. 1, the computer system includes a central processing unit (CPU) 10 connected to a host bus 12. This host bus could conceivably service a multitude of microprocessors. The host bus is then connected to a bridge 14 that interfaces the host bus 12 with a peripheral component interface (PCI) bus 16. As discussed in the background, the PCI bus is connected to high speed peripherals 18 that operate at speeds up to 33 MHz. The PCI bus is then connected to PCI/ISA bridge 20 that interfaces the PCI bus with an industry standard architecture (ISA) bus 22. Connected to the ISA bus are peripheral components that run at lower speeds, typically mass storage devices and ISA expansion memory 24. The bridge 20 includes data, control and address lines that connect to the IDE circuitry and the ISA bus.

In conventional systems, address, control and data lines in the ISA bus and the IDE circuitry must have separate connections since their operations cannot run concurrently. In particular, the ISA refresh cycles cannot run on IDE datapaths without corrupting them. Since ISA refresh runs every 15 ms, the ISA bus is nonoperational for any other functions during the refresh cycles. As result, these lines typically cannot be shared.

Referring now to FIG. 2, one embodiment in accordance with the present invention is shown. As can be seen in comparing FIGS. 1 and 2, the system embodying the present invention is very similar to the conventional system, with the exception of the transceiver 26 that acts as a multiplexer to multiplex the IDE data lines 28 and the ISA bus 30. The IDE data lines originate from the PCI/ISA bridge 32 that are accessible by the CPU 10, sending commands through the host bus 34, the host bridge/PCI bus bridge 36, the PCI bus 38, through the PCI/ISA bridge 32 and ultimately to the IDE circuitry 40 to transfer data from the IDE devices 52–58. Connected to the transceiver on the ISA side are twelve ISA address lines, a programmable chip select, an ISA pin control and four ISA chip select addresses (not shown). These ISA connections relate to ISA transfers that incur heavy loads and very high capacitance, such as those from modern add-in cards to the mother board.

Some examples of non-refresh related ISA functions that will run through the lines multiplexed with the IDE data lines are as follows:

PCI-initiated cycles (ISA cycle driven by PCI/ISA bridge):
        PCI-ISA Memory cycles (read/write), 16-bit memory device responding.
        PCI-ISA Memory cycles (read/write), 8-bit memory device responding.
        PCI-ISA I/O cycles (read/write), 16-bit I/O device responding.
        PCI-ISA I/O cycles (read/write), 8-bit I/O device responding.
    ISA-initiated cycles (ISA bus master in control):
        ISA Memory cycles (read/write), 16-bit memory device responding.
        ISA Memory cycles (read/write), 8-bit memory device responding.
        ISA I/O cycles (read/write), 16-bit I/O device responding.
        ISA I/O cycles (read/write), 8-bit I/O device responding.
    Direct Memory Access (DMA) cycles (Address and control strobes driven by PCI/ISA bridge:
        DMA write, 16-bit I/O device, 16-bit memory device.
        DMA read, 16-bit I/O device, 16-bit memory device.
        DMA write, 8-bit I/O device, 16-bit memory device.
        DMA read, 8-bit I/O device, 16-bit memory device.
        DMA write, 8-bit I/O device, 8-bit memory device.
        DMA read, 8-bit I/O device, 8-bit memory device.

These are examples and are not intended to be all inclusive. On the other side of the transceiver are the IDE data lines and address lines.

Connected to the PCI/ISA bridge 32 is a bank of NAND gates 42 that are each coupled to the chip selects 44–47 in the IDE circuitry. Each of these chip select addresses correspond to different addresses within the IDE connections to identify devices 52–58 illustrated as examples that could be a common hard drive, a CDRom, tape backup, etc. At one input of each of the four NAND gates shown is the chip enable output SOE# from the transceiver 26. This chip enable receives its command from the PCI/ISA bridge 32. At each of the other inputs to the four NAND gates, a separate chip select address from the ISA bus is connected. The IDE chip selects are treated separately in this manner in order to provide strict compatibility to avoid conflict with reading and writing commands. With use of older designs in hard drives, there is a risk of corrupting these drives as a result of this possible conflict. Since, in this embodiment of the present invention, the IDE chip selects are multiplexed in the manner shown in FIG. 2 with the ISA address lines by the transceiver, the connections must be done externally with the NAND gates.

Although not directly related to the disclosed embodiment of the invention, further IDE connections will be explained for completeness. The IDE circuitry 40 has a primary connection 48 and a secondary connection 50. Both connections 48, 50 are connected to the sixteen IDE data lines 28. The primary connection 50 is connected to IDE chip select lines 46, 47 that correspond to different address locations in the primary circuitry. Similarly, the secondary connection 48 is connected to IDE chip select lines 44, 45 that correspond to different address locations in the IDE secondary circuitry. Both the primary and secondary circuitry receive their individual chip select signals from the outputs of the NAND gates 42 to avoid the conflicts discussed above.

IDE connections include control strobes DIOR# corresponding to a read control strobe and DIOW# corresponding to a write control strobe. Also, IORDY is a command by the IDE devices 52–58 that indicates that the particular drive, as a result of its limitations, needs more time to transfer the data. The IORDY connector is shared between the IDE primary and secondary connectors 48, 50. Also included is an interrupt command INT. The INT connectors are usually shared by the two drives since, in most conventional systems, only one device can run at a time. The IDE connectors also include a DRQ command, or data ready command, that indicates to the system the device is ready to transfer data and a DACK, or data acquisition command, that indicates to the device that the data is being transferred. Each of the IDE connectors, the secondary and the primary, have a separate set of these two commands for operating the devices connected to each IDE connector.

In a typical operation, a CPU sends a command down through the host bus 34, the host bus/PCI bridge 36, the PCI bus 38 and through the PCI/ISA bridge 32. The CPU programs the bridge 32 for an IDE data transfer that indicates a specific function to the device. From here, the bridge 32 takes over and controls the data transfer sequence from the IDE devices. The device then indicates by asserting DRQ that it is ready to transfer data. Once data is being transferred, the system through the bridge 32 asserts DACK# indicating to the device that data is being transferred. During this final sequence where data is being transferred, the CPU is out of the picture and free to perform other functions.

The transceiver 26 employed in this embodiment is a standard packaged Octal Bus Transceiver such as the SN54ALS245A Octal Bus transceiver manufactured by Texas Instruments, Dallas, Tex. It is important that the ISA bus and the IDE circuitry be connected to the proper sides of a transceiver to allow for the high speed transfers on the IDE side of the transceiver. It is also important that the PSI/ISA bridge 32 be properly connected to transceiver direction control SDIR and to the enable control SOE#.

To be properly connected, according to Texas Instruments Data Book C. R. 1982, the ISA must be connected to the B bus, with IDE connectors connected to the A bus.

So when both SDIR and SOE# are low, the ISA bus communicates to the IDE data lines and the CPU 10 is the ISA master. When SDIR is high and the SOE# is low, the IDE data lines 28 communicate to the ISA and the PCI/ISA bridge 32 is the ISA master. Finally, when SOE# is high, regardless of SDIR's state, complete isolation is achieved between the ISA bus and the IDE data lines and IDE data transfers can occur. This is illustrated in the time diagram of FIG. 3.

When SOE# is asserted high, the bridge 32 can run an IDE cycle without any communication occurring between the ISA bus and the IDE address. Conversely, when the ISA functions are being carried out, the IDE data lines are completely exposed to the ISA addresses. This is not a problem because when the ISA functions, which are not refresh functions, are occurring, no IDE data transfers are occurring on the IDE data lines. As can be seen in stage 1 of FIG. 3, the IDE data is seen by the ISA address but is unaffected. In the second stage of FIG. 3, the bridge 32 can act as an ISA master with the IDE data lines sharing the ISA address bus, where the IDE data is not affected since no IDE data transfers are occurring. Finally, in the third stage of FIG. 3, both the SDIR and SOE# commands are asserted, isolating the IDE data lines from the ISA bus lines so that IDE data transfer can occur.

In a data transfer utilizing the transceiver in one embodiment of the present invention, a CPU sends an IDE data transfer command through the host/PCI bridge and to the PCI/ISA bridge. The CPU commands program the PCI/ISA bus to perform the IDE data transfer. The chip select SOE# is deactivated. In the command, the address numbers which are positions 2 through 0 are set at logic 0, telling the IDE device that a data port has been selected. Then, in response to a DIOR for a read request or a DIOW for a write request, commands are sent to the IDE devices. One of the devices 52–58 will assert a DRQ signal indicating that one of them is ready to transfer data and, in response to data being transferred, the system will assert a DACK# signal indicating that data is being transferred.

Normally, if ISA lines were multiplexed with IDE data lines, ISA refreshes would impinge on consistent and constant IDE data transfers. However, in the disclosed embodiment of the present invention, with the judicious use of connections and lines, multiplexing several lines from the IDE circuitry with several lines from the ISA bus that are not related to ISA refresh cycles, have been accomplished. Therefore, in a computer system that employs this embodiment of the present invention, a great deal of pins would be saved and an equal amount of communication lines would be shared. Also, since IDE data transfers do not occur during these nonrefresh related ISA operations, the software utilized by the computer system in the central processing unit will not see any degradation as a result of this multiplexing. ISA refresh can run constant without regard to the IDE transfers. The final design results in lower pin count, higher performance and simplicity of design.

From the above description, it will be apparent that the invention disclosed herein provides a novel and advantageous apparatus and method for multiplexing integrated device electronics circuitry with an industry standard architecture bus. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. A device to multiplex integrated device electronics (IDE) circuitry with an industry standard architecture (ISA) bus comprising:

multiplexing means for multiplexing the ISA bus with IDE circuitry, wherein the multiplexing means includes a transceiver to transmit first signals from the ISA bus to IDE circuitry when in a first mode, to transmit second signals from IDE circuitry to the ISA bus when in a second mode and to isolate the IDE circuitry from the ISA bus when in a third mode, wherein the first signals relate to non ISA refresh operations; and control means for controlling the multiplexing means.

2. A device according to claim 1 wherein the control means include a transceiver control to control the transceiver from an ISA/PCI bridge and to multiplex program data cycles from the IDE circuitry with the non-refresh operations from the ISA.

3. A device according to claim 2 further comprising a CPU, wherein the CPU is an ISA master when the device is in the first mode.

4. A device according to claim 2 further comprising a PCI/ISA bus, wherein the PCI/ISA bus is an ISA master when the device is in the second mode.

5. A device according to claim 2 further comprising IDE paths, wherein data transfers can occur through the IDE paths when the device is in the third mode.

6. A computer system comprising:

a central processing unit (CPU);

a peripheral component interface (PCI) bus for interfacing with peripheral components;

a main memory;

a memory control to interface among the CPU, the main memory and the PCI bus;

at least one mass memory device;

integrated device electronics (IDE) circuitry coupled to the mass memory device;

an industry standard architecture (ISA) bus having an expanded memory, the ISA bus for running refresh cycles to the expanded memory;

an ISA/PCI bridge to interface the ISA bus with the PCI bus;

multiplexing means for isolating the IDE circuitry from the ISA bus so ISA refresh cycles can run concurrently with data transfers through the IDE circuitry, wherein the multiplexing means include:

a transceiver to selectively isolate the IDE circuitry from the ISA bus and to logically multiplex the ISA bus and the IDE circuitry such that the ISA bus may refresh the main memory while data transfers occur through the IDE circuitry; and a transceiver control to control the transceiver from the ISA/PCI bridge and to multiplex program data cycles from the IDE circuitry with the non-refresh operations from the ISA bus; and control means for controlling the multiplexing means in response to the ISA/PCI bridge.

7. A computer system according to claim 6 wherein the transceiver is configured to transmit first signals from the ISA bus to IDE paths when in a first mode, to transmit second signals from IDE data lines to the ISA bus when in a second mode and for isolating the IDE data lines from the ISA bus when a third mode.

8. A device according to claim 7 wherein the first signals relate to non ISA refresh operations.

9. A device according to claim 7 or 8 wherein the CPU is an ISA master when the device is in the first mode.

10. A device according to claim 7 or 8 wherein the PCI/ISA bus is an ISA master when the device is in the second mode.

11. A device according to claim 7 or 8 wherein the data transfers can occur through the IDE paths when the device is in the third mode.

* * * * *